(12) United States Patent
Sato et al.

(10) Patent No.: US 9,163,659 B2
(45) Date of Patent: Oct. 20, 2015

(54) CAGED ROLLER BEARING, CAGED ROLLER BEARING ASSEMBLY, AND CAGE

(75) Inventors: Masanori Sato, Iwata (JP); Katsufumi Abe, Iwata (JP); Hitoshi Murakami, Iwata (JP); Hiromitsu Kawai, Iwata (JP)

(73) Assignee: NTN CORPORATION, Osaka (JP)

( * ) Notice: Subject to any disclaimer, the term of this patent is extended or adjusted under 35 U.S.C. 154(b) by 201 days.

(21) Appl. No.: 13/138,989

(22) PCT Filed: May 13, 2010

(86) PCT No.: PCT/JP2010/058099
§ 371 (c)(1),
(2), (4) Date: Nov. 9, 2011

(87) PCT Pub. No.: WO2010/134461
PCT Pub. Date: Nov. 25, 2010

(65) Prior Publication Data
US 2012/0093452 A1    Apr. 19, 2012

(30) Foreign Application Priority Data

| May 19, 2009 | (JP) | 2009-120891 |
| May 19, 2009 | (JP) | 2009-120892 |
| May 19, 2009 | (JP) | 2009-120893 |
| May 19, 2009 | (JP) | 2009-120894 |

(51) Int. Cl.
*F16C 9/04* (2006.01)
*F16C 19/46* (2006.01)
*F16C 9/02* (2006.01)
(Continued)

(52) U.S. Cl.
CPC ... *F16C 9/02* (2013.01); *F16C 9/04* (2013.01); *F16C 19/26* (2013.01); *F16C 19/46* (2013.01); *F16C 19/54* (2013.01);
(Continued)

(58) Field of Classification Search
CPC .............. F16C 9/02; F16C 9/04; F16C 19/26; F16C 19/54; F16C 33/565; F16C 33/4629
USPC ................ 384/464, 470, 527, 573, 576, 625, 384/456–457
See application file for complete search history.

(56) References Cited

U.S. PATENT DOCUMENTS

| 1,555,353 A * | 9/1925 | Giulio ............................ 74/580 |
| 5,482,385 A | 1/1996 | Yokota et al. |

(Continued)

FOREIGN PATENT DOCUMENTS

| CN | 1445465 A | 10/2003 |
| CN | 1699081 A | 11/2005 |

(Continued)

OTHER PUBLICATIONS

JP 2002-348699 machine translation, generated Sep. 3, 2013 by JPO website.*

(Continued)

*Primary Examiner* — Marcus Charles

(57) ABSTRACT

A caged roller bearing includes a plurality of rollers and a roller retaining cage having pockets defined therein at circumferential locations thereof for accommodating the respective rollers therein. A nickel plating layer, which is a plated backing layer, is applied to the entire surface of the roller retaining cage, and an Ni•PTFE plated layer, containing nickel and polytetrafluoroethylene, is applied to the surface of the nickel plating layer.

13 Claims, 9 Drawing Sheets

(51) Int. Cl.
*F16C 33/54* (2006.01)
*F16C 19/26* (2006.01)
*F16C 19/54* (2006.01)
*F16C 33/46* (2006.01)
*F16C 33/56* (2006.01)

(52) U.S. Cl.
CPC .......... *F16C 33/4629* (2013.01); *F16C 33/546* (2013.01); *F16C 33/565* (2013.01)

(56) References Cited

U.S. PATENT DOCUMENTS

| | | | |
|---|---|---|---|
| 5,540,506 A | | 7/1996 | Yokota et al. |
| 5,803,614 A | * | 9/1998 | Tsuji et al. ................... 384/276 |
| 5,988,341 A | * | 11/1999 | Allen et al. ............... 192/110 B |
| 6,086,260 A | * | 7/2000 | Dahlberg ..................... 384/457 |
| 6,764,219 B2 | * | 7/2004 | Doll et al. .................... 384/565 |
| 6,869,222 B1 | * | 3/2005 | Okita et al. .................. 384/462 |
| 6,994,475 B2 | * | 2/2006 | Doll et al. .................... 384/492 |
| 7,648,284 B2 | | 1/2010 | Norimatsu |
| 2005/0254741 A1 | | 11/2005 | Norimatsu |
| 2009/0097790 A1 | | 4/2009 | Hidano et al. |

FOREIGN PATENT DOCUMENTS

| | | | | |
|---|---|---|---|---|
| DE | 2505732 A1 | * | 9/1975 | ............. F16C 23/04 |
| DE | 4116359 A1 | * | 11/1992 | ................ C25B 9/00 |
| JP | 6-78627 | | 11/1994 | |
| JP | 6-313434 | | 11/1994 | |
| JP | 7-332371 | | 12/1995 | |
| JP | 2582402 | | 7/1998 | |
| JP | 11-62979 | | 3/1999 | |
| JP | 2002-348699 | | 12/2002 | |
| JP | 2004092484 A | * | 3/2004 | ............. F04D 29/04 |
| JP | 2004-332899 | | 11/2004 | |
| JP | 2006-105191 | | 4/2006 | |
| JP | 2008133877 A | * | 6/2008 | ............. F16C 33/44 |
| JP | 2008-286374 | | 11/2008 | |

OTHER PUBLICATIONS

JP 2004-332899 machine translation, generated Sep. 3, 2013 by JPO website.*
Japanese Office Action mailed Apr. 2, 2013 for corresponding Japanese Application No. 2009-120891.
Chinese Office Action mailed Apr. 3, 2013 for corresponding Chinese Application No. 201080022038.9.
Extended European Search Report issued Nov. 29, 2012 in corresponding European Patent Application No. 10777694.0.
International Preliminary Report on Patentability mailed Dec. 22, 2011 issued in corresponding International Patent Application No. PCT/JP2010/058099.
International Search Report of PCT/JP2010/058099 mailed Aug. 17, 2010.
Chinese Re-examination Report issued Dec. 30, 2014 in corresponding Chinese Patent Application No. 201080022038.9.
Japanese Office Action mailed Mar. 18, 2014 in corresponding Japanese Application No. 2009-120891.
Chinese Office Action issued Dec. 24, 2013 in corresponding Chinese Patent Application No. 201080022038.9.
Japanese Notification of Reasons for Rejection issued Aug. 27, 2013 in corresponding Japanese Patent Application No. 2009-120891.
Chinese Second Office Action issued Sep. 13, 2013 in corresponding Chinese Patent Application No. 201080022038.9.
Chinese Decision of Re-examination issued Apr. 9, 2015 in corresponding Chinese Patent Application No. 201080022038.9.

* cited by examiner

| CONDITION: CRANKSHAFT REVOLVING SPEED | 9000min⁻¹ |
|---|---|
| LUBRICANT TYPE | FOUR-STROKE CYCLE ENGINE OIL |
| AMBIENT TEMPERATURE | 80°C |
| INITIAL FILM THICKNESS | 25 μm |

NONDISPERSION TYPE

CAGED ROLLER BEARING, CAGED ROLLER BEARING ASSEMBLY, AND CAGE

CROSS REFERENCE TO RELATED APPLICATIONS

This application claims the benefit under 35 U.S.C. Section 371, of PCT International Application No. PCT/JP2010/058099, filed May 13, 2010, which claims Convention priority to Japanese patent applications No. 2009-120891, No. 2009-120892, No. 2009-120893, and No. 2009-120894, all filed May 19, 2009, the entire disclosures of all of which are herein incorporated by reference as a part of this application.

BACKGROUND OF THE INVENTION

1. Field of the Invention

The present invention relates to a caged roller bearing for use in, for example, a crankshaft support structure and a connecting rod support structure both employed in, for example, four wheeled vehicles, bicycles and multipurpose engines and also relates to a roller bearing assembly of a type utilizing the caged roller bearing and a cage for supporting a plurality of rollers. More specifically, the present invention relates to a technique of resolving a frictional wear and an excessive temperature rise, both of which will occur in the cage of the caged roller bearing.

2. Description of Related Art

The caged roller bearing is of a structure comprised of a plurality of rollers and a roller retaining cage, in which the outer peripheral surface of each of those rollers is held in linear contact with the raceway surface defined in each of inner and outer rings. Because of this structure, although the caged roller bearing has a small projected surface area to the bearing, it has advantages in high load bearing capacity and high rigidity. Accordingly, the caged roller bearing is largely employed in various fields of industries including, for example, automobile.

In general, for use with large and small ends of a bicycle, caged roller assemblies in the form of slide bearings or rolling bearings are employed. In the case of a two stroke combustion engine, the large and small ends are lubricated with a mist of a mixed liquid prepared by mixing a gasoline and an engine oil. Accordingly, since the slide bearing involves a frictional wear and an excessive temperature rise, roller bearings such as, for example, the caged roller bearing and a shelled radial bearing are generally utilized. It is, however, to be noted that the caged roller bearing, which is one of the rolling bearings used, has hitherto employed a copper plating or a silver plating in order to prevent an outer diameter and end faces of the roller retaining cage from being frictionally worn and/or being excessively heated.

At a high speed rotation which the copper plating or the silver plating cannot withstand against, the composite plating has been suggested, which has a base material comprised of nickel as a major element in which finely divided particles of fluorine resin are uniformly dispersed so as to represent an eutectoid structure (See the patent document 1 listed below.). The patent document 1 discloses a countermeasure for avoiding the excessive temperature rise and the frictional wear that may be brought about under the condition of high speed use.

PRIOR ART LITERATURE

[Patent Document 1] JP Utility Model Registration No. 2582402

According to the related art, in order to aim at preventing the frictional wear and the excessive temperature rise under the condition of the high speed use, the roller retaining cage is formed with a composite plating containing nickel as a major material and a fluorine resin. However, the frictional wear of the copper and silver plating tends to be generated by dissolving (diminishing) not due to severe conditions of use, but due to the chemical reaction of the plated layer that occurs under influences of a lubricant oil, and, as a result of such a frictional wear, such a problem may occur that the roller retaining cage may be excessively heated to elevated temperature. In particular, such a problem often occurs in the bearing assembly used in a four-stroke cycle combustion engine.

In the case of the four-stroke cycle combustion engine, gasoline and engine oil are not mixed together and the engine oil can be directly supplied to large and small ends. For this reason, a slide bearing assembly, which is inexpensive and has a high load bearing performance as compared with that of the rolling bearing assembly, is used and the rolling bearing assembly is little used.

However, in recent years, in order to improve fuel consumption of the engine, the slide bearing assembly used in a support structure (for example, a connecting rod large diameter portion) is being superseded by the rolling bearing assembly (caged roller bearing). Application of the rolling bearing assembly to the four-stroke cycle engine is the starting point of the problem to be solved by the present invention.

In the meantime, the two-stroke cycle engine and the four-stroke cycle engine make use of different oils. In the four-stroke cycle engine, the engine oil reserved within an oil pan is supplied under pressure to lubricate various parts of the engine and is subsequently circulated back to the oil pan. In contrast thereto, in the two-stroke cycle engine, as the engine oil after having been mixed with a fuel has deposited on rotating and sliding parts, or after it has been supplied under pressure to various parts of the engine to lubricate them, the engine oil enters a combustion chamber together with an air/fuel mixture for combustion. Because of the difference in structure such as the presence or absence of valving mechanisms and the difference in lubricating mechanism, performances required respectively in the two-stroke cycle engine oil and the four-stroke cycle engine oil differ considerably from each other.

A major difference in composition between the two-stroke cycle engine oil and the four-stroke cycle engine oil depends on the presence or absence of sulfate ash and zinc dialkyldithiophosphate (abbreviated as ZnDTP). The two-stroke cycle engine oil contain a low percentage of sulfate ash because no acid neutralizing capability of an ultrabasic cleaning agent, which is a major cause of the ash, is required and also because the ash tends to increase a deposit within the combustion chamber to such an extent as to result in a misfiring of the plug. No ZnDTP is prescribed in the two-stroke cycle engine oil because the two-stroke cycle engine does not require the oil to have an antioxidant capability and also because no severe frictional wear preventing capability is required in the absence of any valving mechanism. While the ZnDTP referred to above is said to be thermally dissolved generally at a temperature within the range of 150 to 200° C., reports have been made that the temperature around a piston and a ring during a high load operating condition exceeded 200° C., and therefore, addition of ZnDTP has the opposite effect of contamination of the piston and conglutination of the ring. In order to avoid the contamination of the piston and the conglutination of the ring, no ZnDTP is added because it requires a large amount of the cleaning agent. The ZnDTP referred to above has an anti-oxidizing capability, a corrosion preventing capability, a load withstanding capability, a frictional wear preventing capability and so on and, as a so-called multi-functional additive, it is largely employed in the engine oil as well as lubricant oil for industrial use.

ZnDTP is dominantly said to have the frictional wear preventing mechanism functioning in the following manners:
(1) Sulfur and phosphor contained in the ZnDTP react with metal to form a film of ferric sulfide or phosphoric salt that prevents a frictional wear.
(2) When the ZnDTP dissolves, a film of polyphosphate is formed on a metal surface that prevents a frictional wear.

As discussed above, the four-stroke cycle engine oil contains ZnDTP as an additive and sulfur is contained in the composition of the ZnDTP. As the frictional wear preventing mechanism, the sulfur is said to react with metal to form the film to enhance the frictional wear preventing effect, but it has been found from various evaluations and examination of products recalled from the market that such an effect is low with the copper plating or the silver plating applied to the roller retaining cage.

Specifically, it has been found that when the roller retaining cage plated with copper or silver is dipped into the four-stroke cycle engine oil of a high temperature, a chemical composition such as copper or silver contained in the oil increases with passage of time, indicating the dissolution thereof into the oil. It has also been found that the silver plating blackens to such an extent that the plating becomes fragile enough to exfoliate easily. It is often found that even in the caged roller bearings recalled from the market, cracking occurs in the plating applied to a member which does not contact with any other member. Accordingly, a surface treatment less susceptible to the additive contained in the engine oil is required. Also, increase of the adhesion with a base material (cage) is effective to prevent the plating from cracking.

SUMMARY OF THE INVENTION

An object of the present invention is to provide a caged roller bearing and a bearing assembly utilizing the caged roller bearing, in which a surface treatment insensitive to additives contained in the oil used is applied to thereby prevent a frictional wear and an excessive temperature rise both occurring in a roller retaining cage and, also, adhesion between the surface treated layer and a base material is increased.

The caged roller bearing of the present invention includes a plurality of rollers; and a ring-shaped roller retaining cage having pockets defined therein at circumferential locations thereof for accommodating the respective rollers therein. A plated backing layer is applied to one or both of at least an outer diametric surface and opposite end faces of the roller retaining cage, which are selected from the entire surface of the roller retaining cage. A Ni•PTFE plated layer, which contains nickel and polytetrafluoroethylene (PTFE), is applied to the surface of the plated backing layer.

It is to be noted that the abbreviation "PTFE" used hereinbefore and hereinafter stands for polytetrafluoroethylene, which is a polymer of tetrafluoroethylene and fluorocarbon resin consisting solely of fluorine atoms and carbon atoms. This fluorocarbon resin represents a polygonal shape.

According to the foregoing construction, since the plating has an adhesive power due to the metal-to-metal bonding, the adhesive power increased due to the bond of metals of similar compositions. As compared with copper or silver, nickel has a property of being hard to react with the additives used and, therefore, elution can be suppressed. Accordingly, it is possible to avoid an undesirable elution of nickel and others, contained in the Ni•PTFE plated layer, into the engine oil. For this reason, a frictional wear of the roller retaining cage and the excessive temperature rise are prevented because of the self-lubricating property of the Ni•PTFE plated layer, and as a result, the engine can be operated for a prolonged period of time. Also, since the plated backing layer and the Ni•PTFE plated layer are provided in one or both of at least an outer diametric surface of the roller retaining cage and the end faces of the roller retaining cage, the frictional wear of the outer diametric surface in the case where the roller retaining cage is of an outer ring guide type can be prevented. Also, in the case where a plurality of the caged roller bearings are arranged in the axial direction in a fashion juxtaposed relative to each other in the axial direction, the frictional wear, which would occur when the end faces of the neighboring roller retaining cages contacts with each other, can be avoided.

PTFE contained in the Ni•PTFE plated layer may be a composition in which particles of PTFE are dispersed in a nickel plating. The plated backing layer may be a nickel plated layer. Since the nickel plated layer and the Ni•PTFE plated layer contain nickel which is a composition common to the both, the composition in the vicinity of those two layers gradually changes such that the interface between the nickel plated layer and the Ni•PTFE plated layer can be bonded with no interstice present. Therefore, the adhesion over the base material, the nickel plated layer and the Ni•PTFE plated layer becomes excellent. (In other words, the adhesive power of the plating depends on the metal-to-metal bonding, and accordingly, due to the provision of the nickel plated layer of a composition similar to that of the Ni•PTFE plated layer, the adhesive power can be increased as compared with the cage treated with the Ni•PTFE plating directly.)

The Ni•PTFE plated layer may have a surface roughness not greater than or equal to Ra 0.7 μm. It is to be noted that the abbreviation "Ra" used hereinabove and hereinafter means the center line average roughness as stipulated in the Japanese Industrial Standards. If the surface roughness exceeds Ra 0.7 μm, there is a tendency that the abrasion loss or wear loss of the plating itself increases. This is because the frictional wear tends to be increasing when projections in surface indentations of the surface roughness are high and the surface roughness is therefore high. In other word, if the surface roughness of the Ni•PTFE plated layer is chosen to be not greater than Ra 0.7 μm, the projections in the surface indentations of the surface roughness itself can be lowered to thereby reduce the frictional wear loss of the plating itself.

In the present invention, the plated backing layer is in the form of a nickel plated layer and the Ni•PTFE plated layer applied to a surface of the plated backing layer contains PTFE in a quantity within the range of 20 to 35 vol. %.

If the amount of the PTFE particles in the Ni•PTFE plated layer is small, the coefficient of friction is high enough to result in an insufficient sliding characteristic and, also, a tendency to increase the wear loss of the plating. In particular, if the amount of the PTFE particles is not greater than 20 vol. %, wear loss becomes considerable. Conversely, if the amount of the PTFE particles is too much, the hardness after the heat treatment is so low that the wear loss tends to increase. Also, it has been ascertained that if the PTFE particles were employed in a large quantity, the cost increased. If the amount of the PTFE particles exceeds 35 vol. %, the hardness after the heat treatment is so low that the frictional wear loss tends to increase.

Thus, when the amount of the PTFE particles in the Ni•PTFE plated layer is selected within the range of 20 to 35 vol. %, the coefficient of friction is low and the sliding property is excellent, and as a result, the wear loss of the plating can be reduced. Also, the cost of manufacture can be reduced.

In the present invention, the plated backing layer may be applied over the entire surface of the roller retaining cage and the Ni•PTFE plated layer applied to the surface of the plated backing layer may be hardened by means of a heat treatment to render the hardness of the Ni•PTFE plated layer after the heat treatment to have a value within the range of Hv 400 to Hv 700. It is to be noted that the abbreviation "Hv" used hereinbefore and hereinafter means the Vickers hardness.

It is to be noted that where the additives are added to the engine oil, the Ni•PTFE plated layer will not constitute any obstruction to the effects of those additives since the additives are dissolved to form a film on the metal surface to thereby prevent the frictional wear.

It is also to be noted that the plating hardness of the Ni•PTFE plated layer after the heat treatment is chosen to be within the range of Hv 400 to Hv 700. The plating hardness referred to above represents a value determined in consideration of the content of the PTFE particles and the hardening temperature.

The result has been obtained that when the plating hardness of the Ni•PTFE PTFE plated layer after the heat treatment was within the range of Hv 400 to Hv 700, the difference in wear loss was not greater than 0.001 mm and no difference was found. Thus, selection of the plating hardness of the Ni•PTFE plated layer after the heat treatment within the range of Hv 400 to Hv 700 as defined above can sustain the frictional wear resistance. If the plating hardness of the Ni•PTFE plated layer after heat treatment is not greater than Hv 400, the wear loss increases. On the other hand, if the plating hardness thereof exceeds Hv 700, the hardness is too high to result in the possibility of the plated layer being cracked.

The roller retaining cage may be carburized and subsequently tempered to have a surface hardness within the range of Hv 450 to Hv 700, with the difference between this surface hardness and the hardness of the Ni•PTFE plated layer being chosen to be not greater than Hv 200. A bearing assembly generally used in a planetary mechanism of a transmission and a connecting rod large diameter end of an engine involves a swinging motion and, therefore, the roller retaining cage revolves while undergoing an elliptical motion. For this reason, if the plating fails to follow an elliptical deformation of the roller retaining cage, the plating is susceptible to cracking and/or exfoliation. The deformation occurring in the roller retaining cage is affected by the rigidity of the roller retaining cage and, if the shape and the material remain the same, it changes with the hardness. For this reason, influences caused by the cage hardness and the plating hardness were confirmed.

In order to confirm the influences referred to above, the following procedures were taken, in which a plurality of sample cages having the respective cage hardness and the respective plating hardness, which are different from each other, were prepared, and a static load is applied to each sample cage. The presence or absence of abnormalities in the plated layer is examined with naked eyes after the amount of deformation within an elastic deformation had been given to each sample cage a predetermined time. As a result, it has been found that neither cracking nor exfoliation was found if the difference between the surface hardness of the cage and the hardness of the plating hardness of the Ni•PTFE plated layer is not greater than Hv 200.

In the present invention, the total film thickness of the plated backing layer and the Ni•PTFE plated layer may be selected within the range of 8 to 22

Using the commercially available caged roller bearing, by means of a crank motion that is identical with that occurring in a production machine, respective wear losses of the various plated layers were compared to determine the total film thickness. In view of the results of the comparison conducted, it has been ascertained that the Ni•PTFE plated layer employed in the practice of the present invention exhibited that in initial dozens of hours, the initial frictional wear ceased to continue and the subsequent frictional wear no longer occurred. Since the initial wear loss was 7 μm, the lowermost limit of the Ni•PTFE plated layer was chosen to be 7 μm.

Also, by choosing the film thickness of the plated backing layer to be, for example, 3±2 μm and the film thickness of the Ni•PTFE plated layer to be within the range of, for example, 7 to 17 μm, the total film thickness of the plated layers as a whole is set to be within the range of 8 to 22 μm.

Since the plating has an adhesive power due to the metal-to-metal bonding, the adhesive power is increased due to the bond of metals of similar compositions. As compared with copper or silver, nickel has a property of being hard to react with the additives used and, therefore, elution can be suppressed.

If the total film thickness of the whole plated layers exceeds 22 μm, an increase of the cost results in. On the other hand, if the total film thickness is smaller than 8 μm, a defect results in in the sequence of, for example, frictional wear of the plating→exposure of the base material of the cage→slide with a connecting rod inner diameter→temperature rise, or frictional wear of the cage→excessive temperature rise of the cage.

In the caged roller bearing of the present invention, due to the self-lubricating performance of the Ni•PTFE plated layer, it is possible to avoid the frictional wear. In particular, if the total film thickness of the plated layers as a whole is chosen to be within the range of 8 to 22 μm, not only can the cost be reduced, but the excessive temperature rise of the roller retaining cage can also be avoided.

A caged roller bearing of the present invention is utilized in the roller retaining cage.

A caged roller bearing assembly of the present invention includes the caged roller bearing according to any one of the foregoing particulars and a raceway ring with which the rollers contact.

A support bearing assembly for supporting a crankshaft of an engine, which utilizes the caged roller bearing according to any one of the foregoing particulars may be applied. A bearing assembly for a connecting rod large diameter end of an engine, which utilizes the caged roller bearing according to any one of the foregoing particulars may be applied. A support bearing assembly for a transmission, which utilizes the caged roller bearing according to any one of the foregoing particulars may be applied.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

A first preferred embodiment of the present invention will be described in detail with particular reference to FIGS. 1A to 1C to FIG. 7. A caged roller bearing according to the first preferred embodiment of the present invention shown therein is used in, for example, a crankshaft support structure or a connecting rod support structure employed in a multipurpose combustion engine for, for example, a four wheeled vehicle or a bicycle. It is, however, to be noted that the caged roller bearing of the present invention is not necessarily used in the crankshaft support structure or the connecting rod support structure.

Figure 1A:
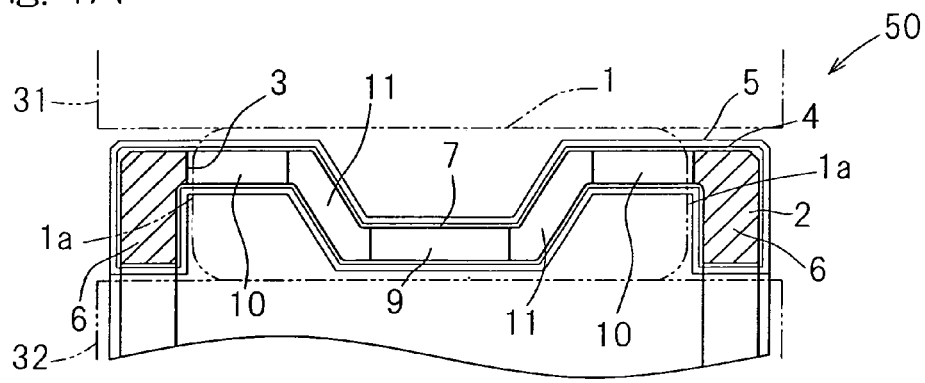
FIG. 1A is a sectional view of a caged roller bearing designed according to a first preferred embodiment of the present invention.
Figure 1B:
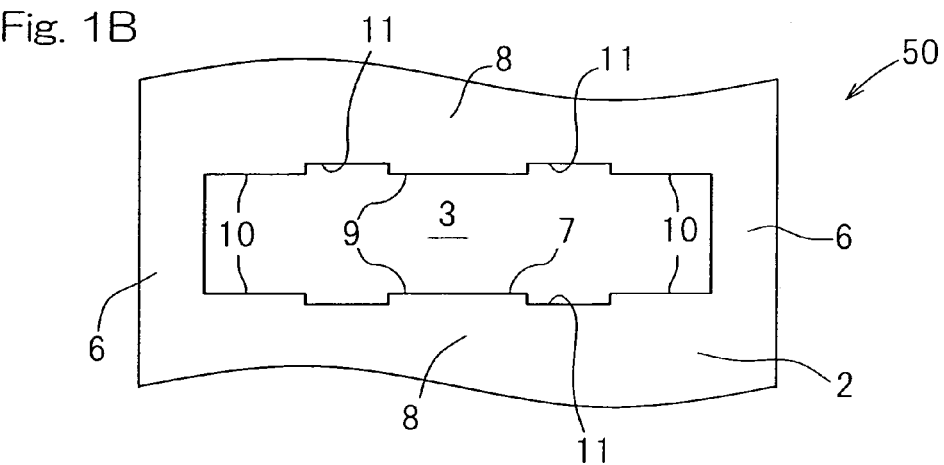
FIG. 1B is a top plan view of the caged roller bearing.

As best shown in FIG. 1A, the caged roller bearing 50 shown therein includes a plurality of rollers 1 and a roller retaining cage 2 and is adapted to be interposed between an outer member 31, which functions as an outer ring, and an inner member 32 which functions as an inner ring. The inner member 32 is in the form of, for example, a shaft member that is to be supported by the caged roller bearing 50 with the rollers 1 held in rolling contact with an outer peripheral surface thereof. The rollers 1 are employed in the form of, for example, needle rollers having its opposite end faces 1a represented by flat faces. As best shown in FIGS. 1A and 1B, the roller retaining cage 2 is of a ring shaped configuration having a plurality of pockets 3 defined therein at a plurality of circumferential locations so as to deploy in a direction circumferentially of the roller retaining cage 2 for accommodating therein the respective rollers 1. The roller retaining cage 2 has an Ni•PTFE plated layer 5, as will be described in detail later, through a plated backing layer 4 (discussed below).

The roller retaining cage 2 is prepared from a thin walled steel plate by the use of any known a press molding technique. As shown in FIG. 1A, the roller retaining cage 2 has a peripheral wall formed in a substantially cylindrical shape having its opposite end portions bent radially inwardly to define respective collars 6 and 6, which are radially inwardly protruding annular members, and also having an axially intermediate portion radially inwardly narrowed, or otherwise depressed, to define an annular reduced diameter portion 7. As best shown in FIG. 1B, the roller retaining cage 2 has a plurality of pillars 8 spaced from each other in a direction circumferentially thereof. Each of those pillars 8 is continued at one end to one of the collars 6 and at the opposite end to the other of the collars 6 with each pocket 3 left between the neighboring pillars 8 and 8. It is, however, to be noted that the roller retaining cage 2 may be of a type having, in place of the collars 6 and 6, flat shaped annular members.

As shown in FIG. 1A, the pillar 8 has a reduced diameter portion 7 at axially intermediate portion thereof. The reduced diameter portion 7 is formed with an intermediate roller constraining protrusion 9 at side edge segments forming a portion of an open peripheral edge defining the respective pocket 3. Also, the pillar 8 has a pair of large diameter portions at respective axial end portions and each axial end portion is formed with an end roller constraining protrusion 10 positioned on respective sides of the roller constraining protrusion 9 and adjacent the associated collars 6. A portion of each of the side edge segments of the open peripheral edge defining the respective pocket 3, which is located at the transit between the intermediate roller constraining protrusion 9 and each end roller constraining protrusion 10, is inclined to define a corresponding inclined side edge portion 11. The inclined side edge portions 11 and 11 at the respective transits between the intermediate roller constraining protrusions 9 and the adjacent end roller constraining protrusions 10 are so inclined radially inwardly in a sense opposite to each other as to converge at a point radially inwardly of the roller retaining cage 2 and are operable to guide the corresponding roller 1 in a direction circumferentially of the roller retaining cage 2. The roller 1 within the respective pocket 3 is constrained by and between the roller constraining protuberances 9 and 10 radially displaced with each other so as not to fall out of the pocket 3 and is also guided by the inclined side edge portions 11 in the circumferential direction of the roller retaining cage 2.

Hereinafter, the plated backing layer 4 and the Ni•PTFE plated layer 5 will be discussed in detail.

Figure 1C:
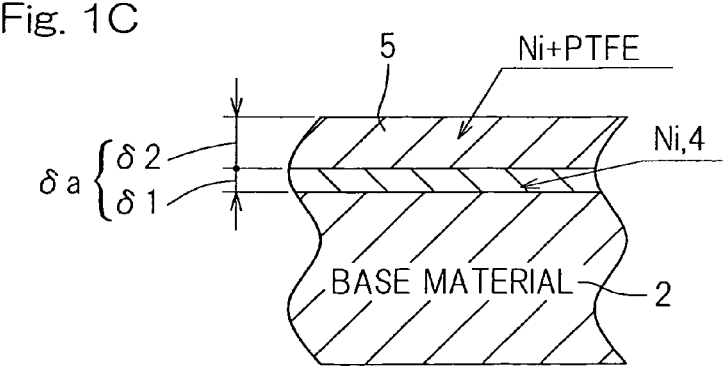
FIG. 1C is a fragmentary sectional view showing a base material surface provided with an Ni•PTFE plated layer formed thereon through a plated backing layer.

As shown in FIGS. 1A and 1C, the roller retaining cage 2 has its entire surface applied with the plated backing layer 4 and the Ni•PTFE plated layer 5, containing nickel and PTFE, is in turn applied over the entire surface of the plated backing layer 4. The plated backing layer 4 is a nickel plated layer. The surface to be plated is the entire surface of the roller retainer cage 2 including end faces, an inner diametric surface and the four cornered open peripheral edge defining each pocket 3.

The nickel plated layer 4 referred to above has a film thickness δ1, which is chosen to be, for example, 3±2 μm, and the Ni•PTFE plated layer 5 has a film thickness δ2 which is chosen to be, for example, within the range of 7 to 17 μm. It is, however, to be noted that the film thickness δ1 of the nickel plated layer 4 is not necessarily be limited to 3±2 μm. The total film thickness δa, that is, the sum of the respective film thicknesses δ1 and δ2 of those plated layers 4 and 5 is chosen to be within the range of 8 to 22 μm.

The reason for the selection of the range of 8 to 22 μm for the total film thickness δa will now be discussed.

Figure 2:
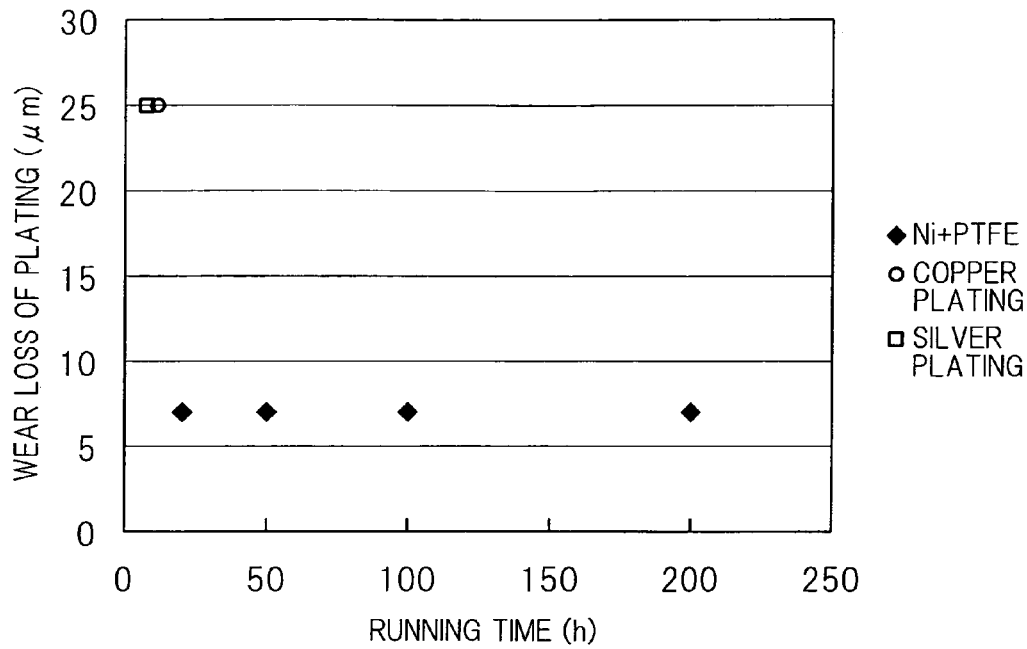
FIG. 2 is a chart showing the relationship between the operating time and the wear loss of the plating layer.

Using the commercially available caged roller bearing of a size (28 mm in inner diameter, 34 mm in outer diameter and 17 mm in width), by means a crank motion that is identical with that occurring in a production machine, respective wear losses of the various plated layers were compared to determine the total film thickness. As shown in FIG. 2, in view of the results of the comparison conducted, it has been ascertained that each of the nickel plated layer and the Ni•PTFE plated layer 5 exhibited that in initial dozens of hours, the initial frictional wear ceased to continue and the subsequent frictional wear no longer occurred. Also, since the wear loss of the plated layer was 7 μm, the minimum film thickness (the lowermost limit) of the Ni•PTFE plated layer 5 was chosen to be 7 μm.

If the total film thickness of the whole plated layers exceeds 22 μm, an increase of the cost results in. On the other hand, if the total film thickness is smaller than 8 μm, a defect results in in the sequence of, for example, frictional wear of the plating→exposure of the base material of the cage→slide with a connecting rod inner diameter→temperature rise, or frictional wear of the cage→excessive temperature rise of the case. With the caged roller bearing designed according to this preferred embodiment, prevention of the frictional wear can be realized by a self-lubricating performance of the Ni•PTFE plated layer.

In particular, if the total film thickness δa of the whole plated layers is chosen to be within the range of 8 to 22 μm, not only can the cost be reduced, but also an undesirable excessive temperature rise of the roller retaining cage can be avoided.

Figure 3:
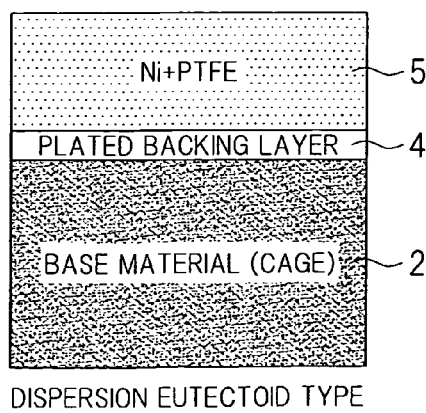
FIG. 3 is a fragmentary sectional view showing an example, in which finely divided particles of polytetrafluoroethylene are dispersed in a nickel plating.

PTFE contained in the Ni•PTFE layer 5 is prepared by dispersing finely divided particles (shown by blackened spots in FIG. 3) of polytetrafluoroethylene so as to represent an eutectoid structure into a base material comprised of nickel as a major constituent element. The amount of the PTFE particles contained in the Ni•PTFE plated layer 5 is defined within the range of 20 to 35 vol. %.

The manner of determining the amount of the finely divided PTFE particles referred to above will now be described specifically.

Figure 4A:
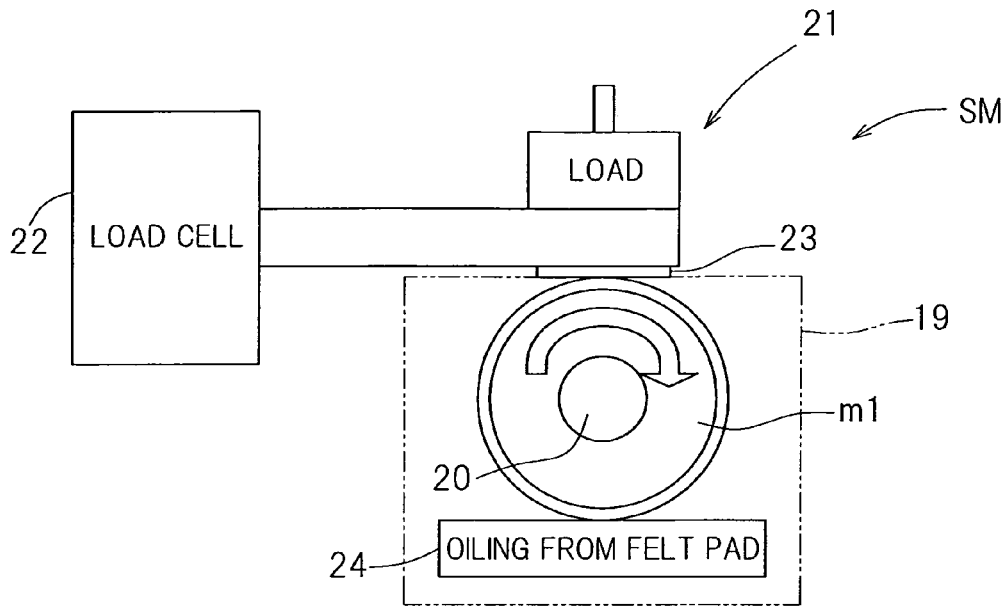
FIG. 4A is a diagram used to explain a method of performing a Savin wear test with which the wear loss is comparatively evaluated.

For the determination of the optimum value of the amount of the PTFE particles contained in the Ni•PTFE plated layer 5, the coefficient of friction was measured by mean of the Savin wear test. The Savin wear test is a test to perform a comparative evaluation of the wear loss. For example, as shown in FIG. 4A, the Savin wear testing machine SM includes a sample holder 19 for holding a test piece m1 to be tested, a rotational drive unit 20 for driving the test piece m1 then held by the sample holder 19, and load imposing unit 21 for applying a predetermined load to the test piece m1 held by the sample holder 19. The load imposing unit 21 applies the predetermined load to the test piece m1 by means of a biasing means such as, for example, a spring, and the load thereof is measured by a load cell 22.

As a counterpart member 23 of the load imposing unit 21, with which the test piece m1 is held in sliding contact, a steel for machine structural use such as, for example, SCM415 as stipulated according to the Japanese Industrial Standards (JIS), for example, is employed. It is, however, to be noted that the counterpart member 23 is not necessarily limited to SCM415. The sample holder 19 has a felt pad 24 provided therein, and a felt pad oiling is accomplished when and so long as the test piece m1 is driven by the rotational drive unit 20 with its outer peripheral surface held in contact with an inner peripheral surface of the felt pad 24. The wear loss can be measured by fitting the test piece m1 to the sample holder 19, driving the test piece m1 by means of the rotational drive unit 20 while the load is applied to the test piece m1 and allowing the test piece m1, then driven in one direction, to be held in sliding contact with the counterpart member 23.

Test conditions employed are as follows:
Sliding Velocity: 0.05 m/sec., 5.0 m/sec.
Surface Pressure: 0.5 GPa
Test Time: 30 min (5.0 m/sec.), 60 min (0.05 m/sec.)
Lubricant Oil: Mobil Velocite® No. 3 (VG 2)

Figure 4B:
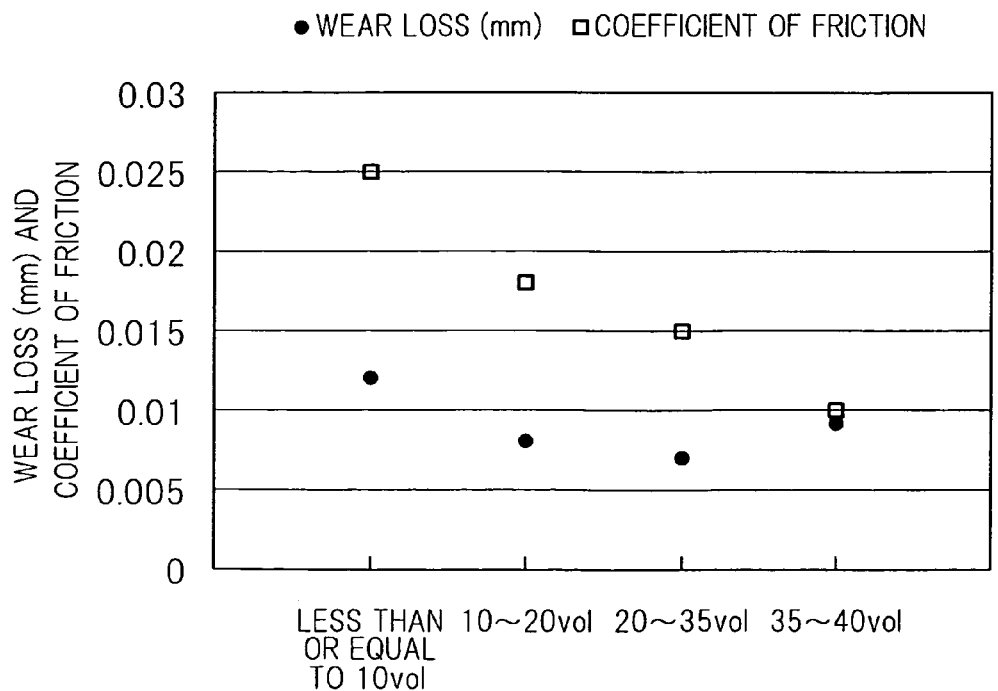
FIG. 4B is a chart showing the relationship between the amount of PTFE, the wear loss and the coefficient of friction.

As a result, it has been ascertained that the greater the amount of the PTFE particles in the Ni•PTFE plated layer 5, the lower the coefficient of friction as shown in the chart of FIG. 4B.

In a manner similar to the wear loss comparison test that resulted in the determination of the total film thickness δa, a wear loss comparison was performed to determine the extent to which the difference in amount of the PTFE particles used affect. As a result, it has been found that as shown in the chart of FIG. 4B, if the amount of the PTFE particles is small, the coefficient of friction is high enough to result in an insufficient sliding characteristic and, also, a tendency to increase the plating wear loss. In particular, if the amount of the PTFE particles is not greater than 20 vol. %, frictional wear loss becomes considerable. Conversely, if the amount of the PTFE particles is too much, the hardness after the heat treatment is so low that the wear loss tends to increase. Also, it has been ascertained that if the PTFE particles were employed in a large quantity, the cost increased.

It is to be noted that in the chart of FIG. 4B, the legend "10~20 vol" should be read as meaning the range of 10 to 20 vol. %, the legend "20~35 vol" should be read as meaning the range of 20 to 35 vol. %, and the legend "35~40 vol" should be read as meaning the range of 35 to 40 vol. %.

In view of the coefficient of friction and the results of the comparison conducted to determine the wear loss, it has been made clear that the amount of the PTFE particles has an optimum range. Hence, in the practice of the embodiment now under discussion, in view of the coefficient of friction and the results of the comparison conducted to determine the wear loss, the amount of PTFE particles contained in the Ni•PTFE plated layer 5 is chosen to be within the range of 20 to 35 vol. %. By so determining the range of the amount of PTFE particles added, an excellent sliding characteristic with a low coefficient friction can be obtained and the plating wear loss can be reduced. Also, it becomes possible to reduce the cost of manufacture. Accordingly, because of the self-lubricating property of the Ni•PTFE plated layer 5, it is possible to prevent the frictional wear and the excessive temperature rise of the roller retaining cage 2, making it possible for the engine or the like to be worked for a substantial period of time.

The standard value of the surface roughness of the Ni•PTFE plated layer 5 will be described.

In the practice of the preferred embodiment, the surface roughness of the Ni•PTFE plated layer 5 is chosen to be not greater than Ra 0.7 μm.

As defined hereinbefore, the abbreviation "Ra" used hereinabove and hereinafter means the center line average roughness as stipulated in the Japanese Industrial Standards and is measured in accordance with the standards for the surface roughness stipulated under JIS 0601-1976. The center line average roughness is equal to the value of Ra, which is expressed in units of micrometer by the following equation, when a measuring portion of a length L is cropped from the roughness curve in a direction of the center line thereof and the center line, along which the cropping has been made, is expressed in the X-axis; the direction of axial magnification is expressed in the Y-axis; and the roughness curve is expressed by y=f(x):

$$Ra = \frac{1}{L}\int_0^L |f(x)| dx$$

Figure 5:
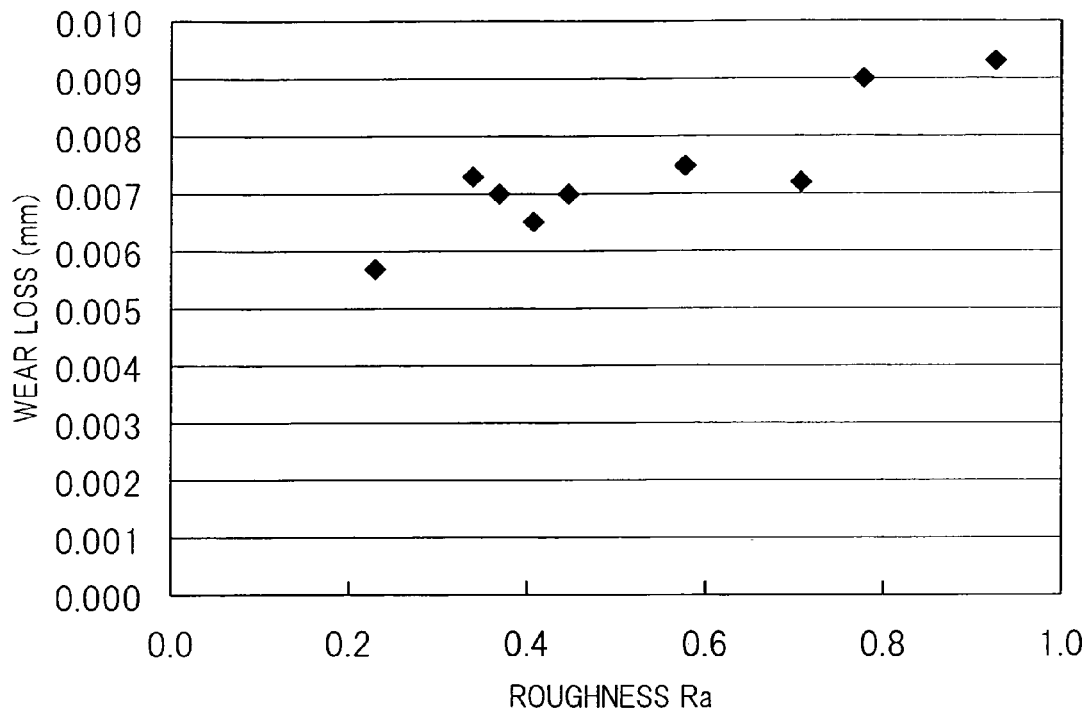
FIG. 5 is a cart showing the relationship between the surface roughness and the wear loss of the Ni•PTFE plated layer.

In order to ascertain if the wear loss of the plating itself changes with change in surface roughness of the Ni•PTFE plated layer 5, a wear loss comparison was carried out using the caged roller bearing and the previously described test conditions both employed during the film thickness evaluation discussed hereinbefore. As a result, as shown in the chart of FIG. 5, if the surface roughness exceeds Ra 0.7 μm, there is a tendency that the wear loss increases. This is because the frictional wear tends to be increased when projections in surface indentations of the surface roughness are high and the surface roughness is therefore high.

The hardness of the Ni•PTFE plated layer 5 will now be described.

In the practice of the preferred embodiment now under discussion, the resistance to frictional wear can be sustained when the Ni•PTFE plated layer 5 is hardened by means of a heat treatment and the plating hardness of the Ni•PTFE plated layer 5 after the heat treatment is rendered to be within the range of Hv 400 to Hv 700. In order to determine the optimum value of the plating hardness of the Ni•PTFE plated layer 5, the frictional wear comparison was carried out by means of the same cage and under the same test conditions as those employed to determine the total film thickness δa. The range of Hv 400 to Hv 700 of the plating hardness referred to above is a value determined by the content of the PTFE particles and the hardening temperature. Accordingly, s sample to be tested was prepared with the amount of the PTFE particles fixed and with the hardening temperature varied.

Figure 6:
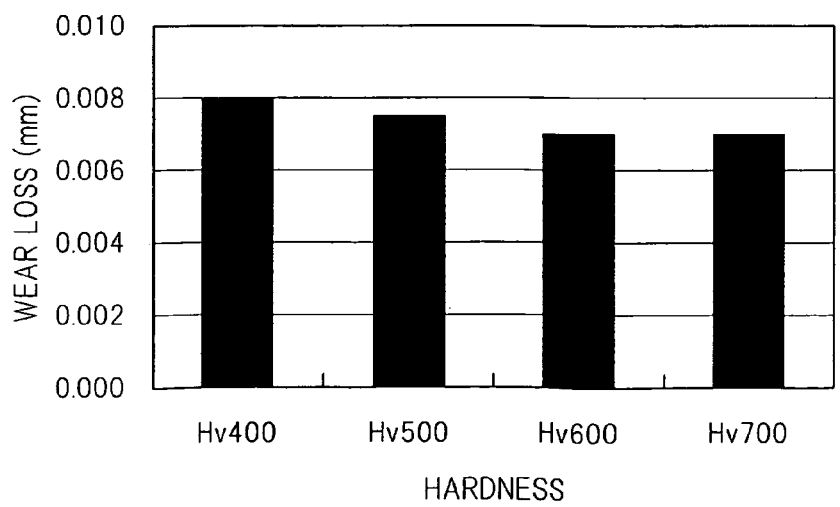
FIG. 6 is a chart showing the relationship between the wear loss and the plating hardness of the Ni•PTFE plated layer after hardening.

As shown in FIG. 6, from the result given thereby, it has been found that when the plating hardness of the Ni•PTFE plated layer 5 after the heat treatment was within the range of Hv 400 to Hv 700, the difference in wear loss was not greater than 0.001 mm and no difference was found. If the plating hardness of the Ni•PTFE plated layer 5 is smaller than Hv 400, the wear loss increases. On the other hand, if the plating hardness thereof exceeds Hv 700, the hardness is too high to result in the possibility of the plated layer being cracked.

The difference in hardness between the Ni•PTFE plated layer 5 and the roller retaining cage 2 will now be described.

In the practice of the preferred embodiment now under discussion, the roller retaining cage 2 is carburized and subsequently tempered to have a surface hardness within the range of Hv 450 to Hv 700, with the difference between this surface hardness and the plating hardness of the Ni•PTFE plated layer 5 chosen to be not greater than Hv 200.

A bearing assembly generally used in a planetary mechanism of a transmission and a connecting rod large diameter end of an engine involves a swinging motion and, therefore, the roller retaining cage 2 revolves while undergoing an elliptical motion. For this reason, if the plating fails to follow an elliptical deformation of the roller retaining cage 2, the plating is susceptible to cracking and/or exfoliation. Such a deformation occurring in the roller retaining cage 2 is affected by the rigidity of the roller retaining cage 2 and, if the shape and the material remain the same, it changes with the hardness. For this reason, influences caused by the cage hardness and the plating hardness were investigated. For this purpose, the following procedures were taken, in which a plurality of sample cages having the respective cage hardness and the respective plating hardness, which are different from each other, were prepared, a static load is applied to each sample cage 2, and the presence or absence of abnormalities in the plated layer is examined with naked eyes after the amount of deformation within an elastic deformation (Cage deformation of 0.5 mm) had been given 10,000 times. As a result, as shown in the following Table 1, it has been found that neither cracking nor exfoliation is found if the difference between the surface hardness of the roller retaining cage 2 and the hardness of the plating hardness of the Ni•PTFE plated layer 5 is not greater than Hv 200.

TABLE 1

| Plating Hardness (Hv) | Cage Hardness (Hv) | Hardness Difference (Hv) | Results |
|---|---|---|---|
| 400 | 500 | 100 | No cracking, No exfoliation |
| 400 | 700 | 300 | Cracking, exfoliation |
| 500 | 500 | 0 | No cracking, No exfoliation |
| 600 | 600 | 0 | No cracking, No exfoliation |
| 600 | 450 | 150 | No cracking, No exfoliation |
| 700 | 450 | 250 | Cracking, No exfoliation |

Dissolution of the surface treatment will now be discussed.

Figure 7:
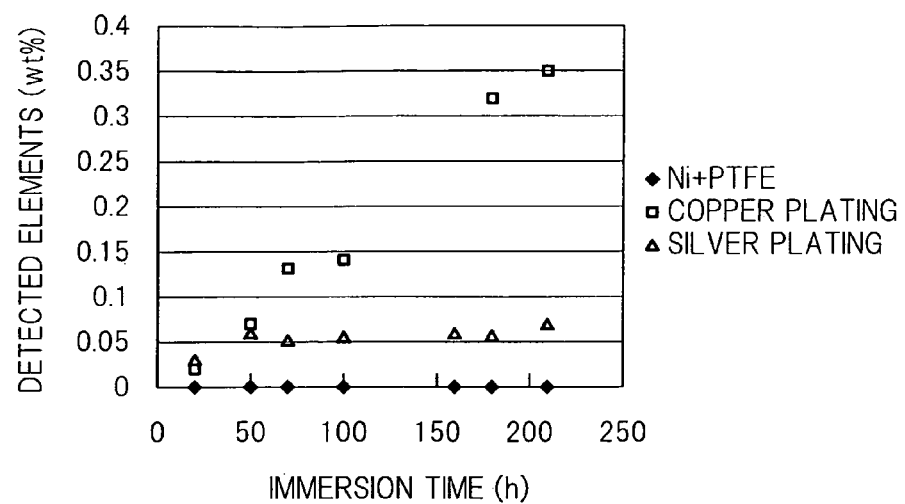
FIG. 7 is a chart showing the relationship between the immersion time and the amount of elements detected.

It has been confirmed by means of a dipping test conducted that metallic components or the like contained in the Ni•PTFE plated layer 5 so formed in accordance with this embodiment did not dissolve under a high temperature condition of the four-stroke cycle engine oil. As shown in the chart of FIG. 7, it is known that as for the copper or silver plating a substantial amount of elements have been detected within an oil with passage of the dipping time. In contrast thereto, the sample prepared in accordance with this embodiment has shown that elements both associated with the Ni•PTFE plated layer 5 and the plated backing layer 4 were not detected even when 200 hours had been passed.

The adhesive power of the plating brought about by the presence or absence of the backing treatment will be discussed.

The sample prepared in accordance with this embodiment was plated with nickel as a backing treatment. The adhesive power brought about by the presence or absence of the plated backing layer was comparatively examined using the actual caged roller bearing (of a size, 28 mm in inner diameter, 34 mm in outer diameter and 17 mm in width) which was subjected to the crank motion. As a result, as shown in the following Table 2, the product having no nickel plated layer as a backing layer exhibited a frictional wear and exfoliation of the plated layer after the test. In contrast thereto, the sample designed according to the embodiment and provided with the backing layer exhibited no cracking taking place therein, but a slight cracking found after the test. Accordingly, it has been made clear that the backing treatment is necessary to increase the adhesive power of the plating.

TABLE 2

| Backing Treatment | Frictional Wear in Plating | Cracking in Plating |
|---|---|---|
| Employed | Slight | None |
| Not employed | Slight | Found |

In the caged roller bearing 50 described above, the plated backing layer 4 was applied to the roller retaining cage 2 and the Ni•PTFE plated layer 5 was applied to the surface of the plated backing layer 4. Since nickel is characteristically insoluble to (hard to react with) the additives employed, dissolution of, for example, nickel contained in the Ni•PTFE plated layer 5 can be prevented. Also, the provision of the plated backing layer 4 between the Ni•PTFE plated layer 5 and the base material (i.e., the roller retaining cage) is effective to increase the bonding strength between the base material and the Ni•PTFE plated layer 5 and, accordingly, a possible exfoliation of the plating is prevented (since the plating has an adhesive power due to the metal-to-metal bonding, the adhesive power is increased due to the bond of metals of similar compositions). In addition, because of the self-lubricating function of the PTFE particles contained in the Ni•PTFE plated layer 5, the coefficient of friction of the plating decreases and the frictional wear resistance increases. Accordingly, due to the self-lubricating performance of the Ni•PTFE plated layer 5, the prevention of the frictional wear can be accomplished.

Since the nickel plated layer, which is the plated backing layer 4, and the Ni•PTFE plated layer 5 contain nickel which is a composition common to the both, the composition in the vicinity of those two layers gradually changes such that the interface between the nickel plated layer and the Ni•PTFE plated layer 5 can be bonded with no interstice present. Therefore, the adhesion over the base material, the nickel plated layer and the Ni•PTFE plated layer 5 is excellent. As described above, increase in adhesion results in because the metal-to-metal bond is strengthened in the presence of the plating of a similar composition therebetween. Yet, selection of the surface roughness of the Ni•PTFE plated layer 5, which is not greater than Ra 0.7 µm, is effective to lower the projections in the surface indentations of the surface roughness itself to thereby reduce wear loss of the plating itself.

Hereinafter, second to fifth preferred embodiments of the present invention will be described. It is to be noted that in the description that follow, component parts explained in connection with the preceding embodiment or embodiments of the present invention are designated by like reference and, therefore, the details thereof are not reiterated, noting that, where only a part of the construction is explained, the rest of such construction is to be understood as similar to that described in connection with the preceding embodiment of the present invention. It is also to be noted that not only can a combination of the components specifically described in connection with any one of the preferred embodiments of the present invention be made, but also a combination of some or all of those embodiments of the present invention can be made.

Figure 8:
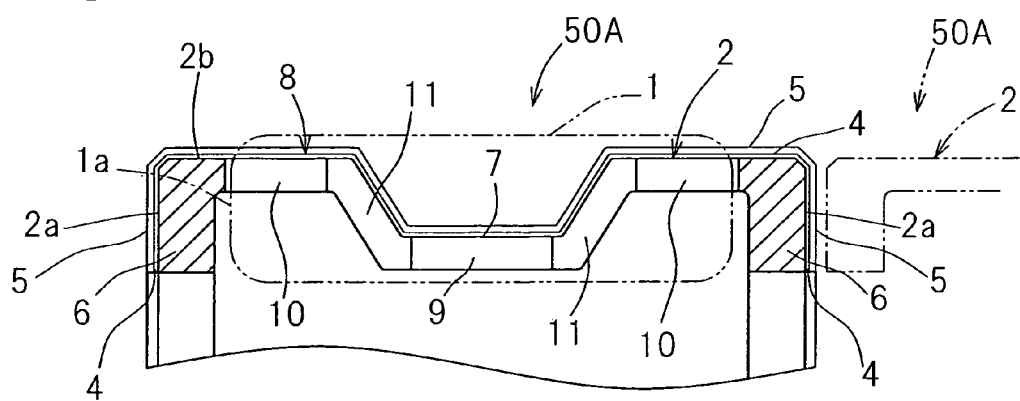
FIG. 8 is a sectional view showing the caged roller bearing designed according to a second preferred embodiment of the present invention.

In the caged roller bearing, now identified by 50A, which is designed in accordance with the second preferred embodiment of the present invention shown in FIG. 8, the plated backing layer 4 and the Ni•PTFE plated layer 5 are applied only to the opposite end faces 2a and an outer diametric surface 2b of the roller retaining cage 2. Where the plurality of the caged roller bearings 50A are arranged in juxtaposed fashion relative to each other in a direction axially of each caged roller bearing 50A, it occurs that the end faces 2a of the neighboring roller retaining cages 2 and 2 may contact with each other, and, accordingly, due to the presence of the plated backing layer 4 and the Ni•PTFE plated layer 5 on the end faces 2a of those neighboring roller retaining cages 2, the frictional wear resulting from the contact between the neighboring roller retaining cages 2 with each other decreases enough to increase the service lifetime.

Also, in the roller retaining cage 2 of an outer ring guide type, it may occur that the outer diametric surface 2b of the roller retaining cage 2 may contact the outer member, and, accordingly, the frictional wear of the outer diametric surface 2b can be avoided in the presence of the plated backing layer 4 and the Ni•PTFE plated layer 5 on the outer diametric surface 2b.

In any event, the plated backing layer 4 and the Ni•PTFE plated layer 5 may be applied only to the opposite end faces 2a of the roller retaining cage 2 or only to the outer diametric surface 2b of the roller retaining cage 2. Needless to say, the plated backing layer 4 and the Ni•PTFE plated layer 5 may be applied to the entirety of the roller retaining cage 2, in which case since the plated layers deposit on a roller guide face of each of the pockets 3 in the roller retaining cage 2, not only can the frictional wear of the rollers 1 be accomplished, but also the number of process steps required in performing a plating operation can be reduced.

Figure 9A:
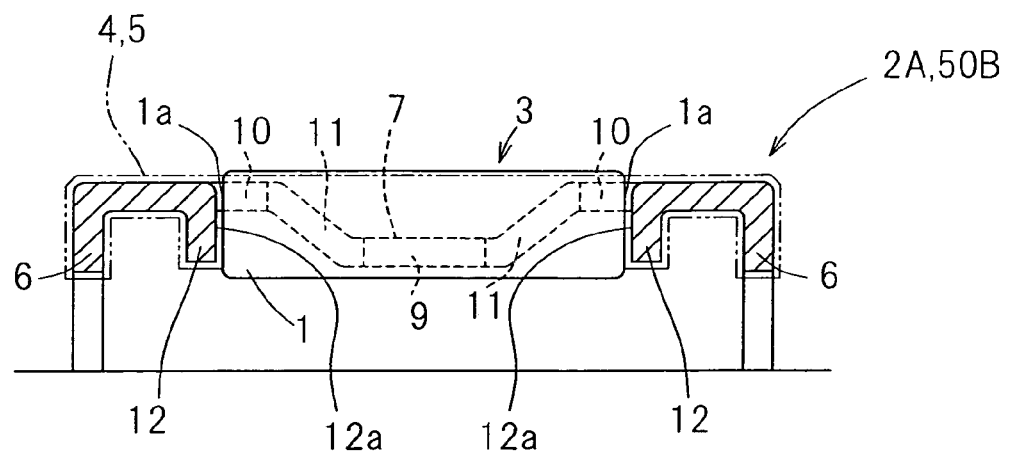
FIG. 9A is a sectional view showing the caged roller bearing designed according to a third preferred embodiment of the present invention.
Figure 9B:
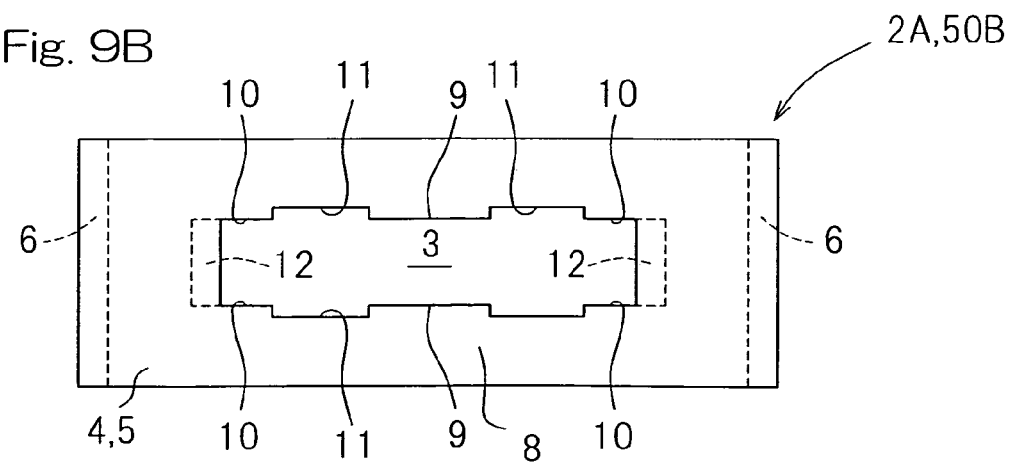
FIG. 9B is a fragmentary top plan view of the caged roller bearing.

FIGS. 9A and 9B illustrate the third preferred embodiment of the present invention. The roller retaining cage 2A employed in the caged roller bearing according to the third embodiment, now identified by 50B, is of a structure in which the opposite end edge segments of the open peripheral edge defining each of the pockets 3 in the peripheral wall of the cage 2A are formed integrally with respective guide projections 12 protruding in a direction radially inwardly of the peripheral wall substantially at right angles to the peripheral wall for guiding associated end faces 1a, 1a of the corresponding roller 1. Since the roller end faces 1a are guided by the guide projections 12, respective guide faces 12a of the roller retaining cage 2A for guiding the roller end faces 1a extend a distance greater than usual in a direction radially inwardly or shift in a direction radially inwardly.

Accordingly, up until the angle of inclination of each roller 1 becomes relatively large, the roller end faces 1a are supported without being diverted from the associated guide faces 12 in a direction radially inwardly. Since the guide projections 12 are provided in the opposite end edge segments of each pocket 3, the length of the roller 1 relative to the width of the roller retaining cage 2A does not change and an undesirable departure of one or both of the roller end faces 1a can be prevented in the presence of the guide projections 12.

In this third embodiment, the plated backing layer 4 is applied to the entire surface of the roller retaining cage 2A and the previously described Ni•PTFE plated layer 5 is applied to the surface of the plated backing layer 4. Since the plated backing layer 4 is also applied to the guide faces 12a of the guide projections 12 and the Ni•PTFE plated layer 5 is also applied to the surface of the plated backing layer 4 on the guide faces 12a, the frictional wear of the roller end faces 1a can be avoided.

Figure 10A:
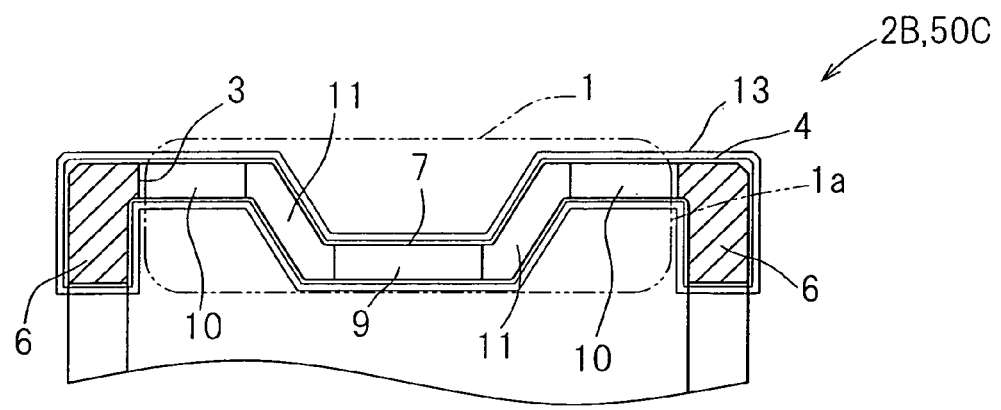
FIG. 10A is a sectional view showing the caged roller bearing designed according to a fourth preferred embodiment of the present invention.
Figure 10B:
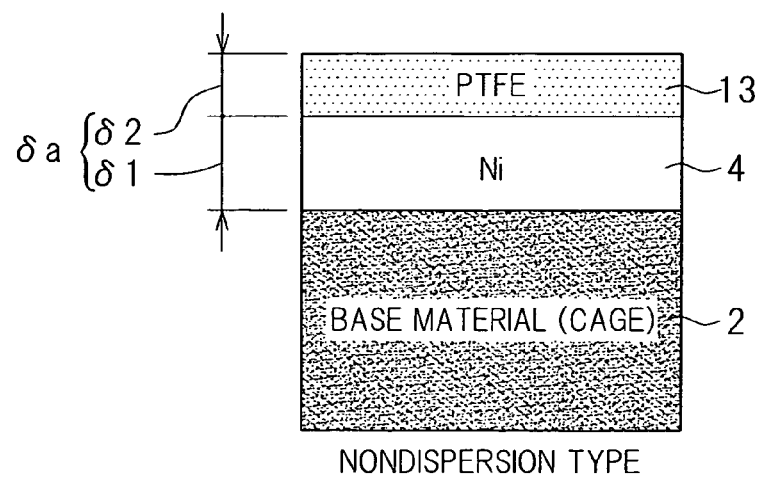
FIG. 10B is a fragmentary sectional view showing an example in which the PTFE is of a non-dispersed type.

FIGS. 10A and 10B illustrate the fourth preferred embodiment of the present invention. The roller retaining cage, now identified by 2B, of the caged roller bearing 50C according to this fourth embodiment is of a structure in which the entire surface of the caged roller bearing 50C is coated with the nickel plated layer, i.e., the plated backing layer 4, which is in turn composited on the surface of the nickel plated layer with PTFE 23. According to this fourth embodiment, effects similar to those afforded by any one of the previously described embodiments can be obtained with the use of a rather smaller amount of the PTFE than that used to uniform dispersion type as shown in and described with reference to FIG. 3. Because of the amount of the PTFE reduced, the cost of manufacture can be reduced.

Figure 11A:
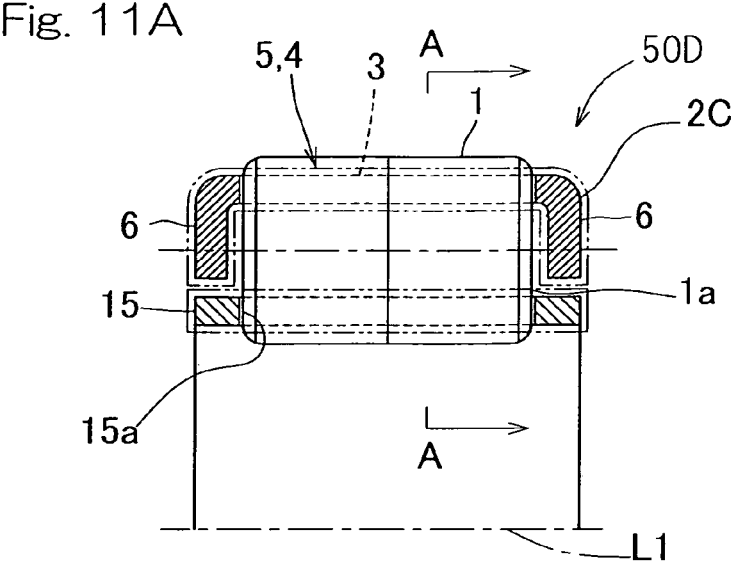
FIG. 11A is a sectional view showing the caged roller bearing designed according to a fifth preferred embodiment of the present invention.
Figure 11B:
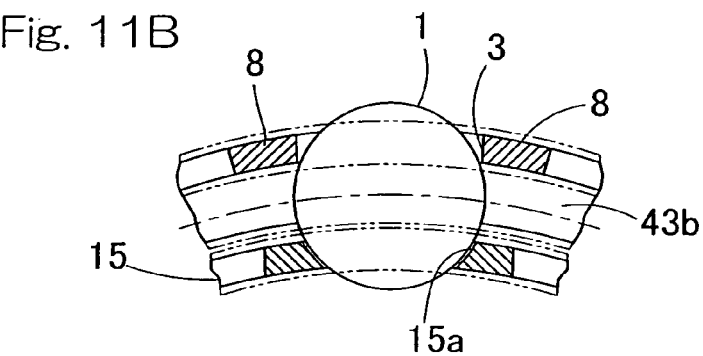
FIG. 11B is a cross sectional view taken along the line A-A in FIG. 11A.

FIGS. 11A and 11B illustrate the fifth preferred embodiment of the present invention, in which the caged roller bearing 50D is made up of a plurality of rollers 1 and first and second roller retaining cages 2C and 15. In particular, FIG. 11A is a sectional view of the caged roller bearing cut in a plane containing the longitudinal axis L1 of the caged roller bearing and FIG. 11B is a cross sectional view taken along the line A-A in FIG. 11A. As shown therein, the first roller retaining cage 2C is rendered to be of a structure similar to the roller retaining cage 2 designed in accordance with the first embodiment with particular reference to FIGS. 1A to 1C to FIG. 7. The plated backing layer 4 and the Ni•PTFE plated layer 5 are applied to the entire surface of the first roller retaining cage 2C. On the other hand, the second roller retaining cage 15 is of a ring shape comprised of a flat surface and has pockets 15a defined therein for retaining the corresponding rollers 1. The plated backing layer 4 and the Ni•PTFE plated layer 5 are also applied to the entire surface of the second roller retaining cage 15. This second roller retaining cage 15 are arranged on respective inner peripheral surfaces of the collars 6 in the first roller retaining cage 2C with a radial gap therebetween.

Figure 12:
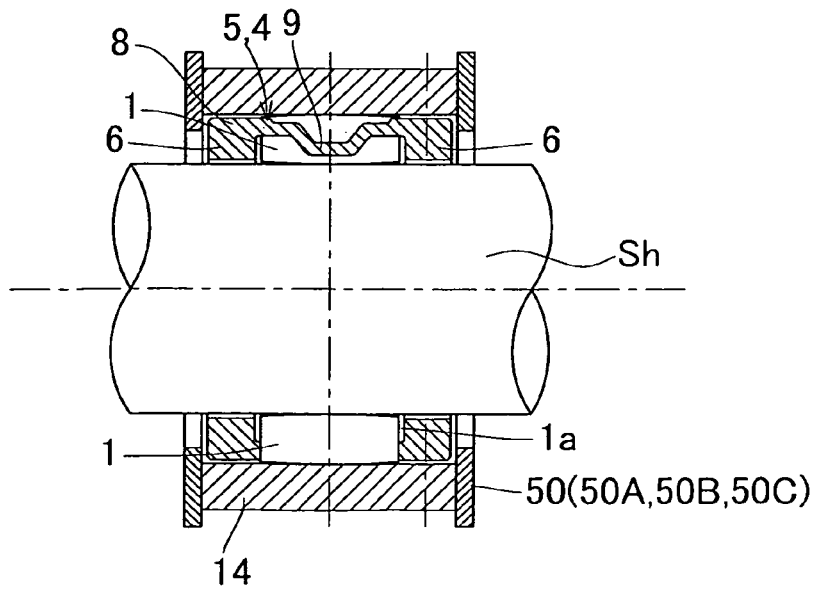
FIG. 12 is a sectional view of a bearing assembly of a type utilizing the caged roller bearing according to any one of the various preferred embodiment of the present invention.

FIG. 12 illustrates a bearing assembly of a structure utilizing the caged roller bearing designed in accordance with any one of the various embodiments hereinbefore described. The illustrated caged roller bearing assembly includes the caged roller bearing 50 (50A, 50B, 50C) of the structure according to one of the previously described embodiments, and a raceway ring 14 with which the rollers 1 rollingly contact. The raceway ring 14 in the instance as shown is in the form of an outer ring. The caged roller bearing assembly may, however, be of a structure including, in addition to the caged roller bearing 50 (50A, 50B, 50C) of the structure according to one of the previously described embodiments, and one of the outer ring and the inner ring (or the shaft Sh) or both.

Figure 13:
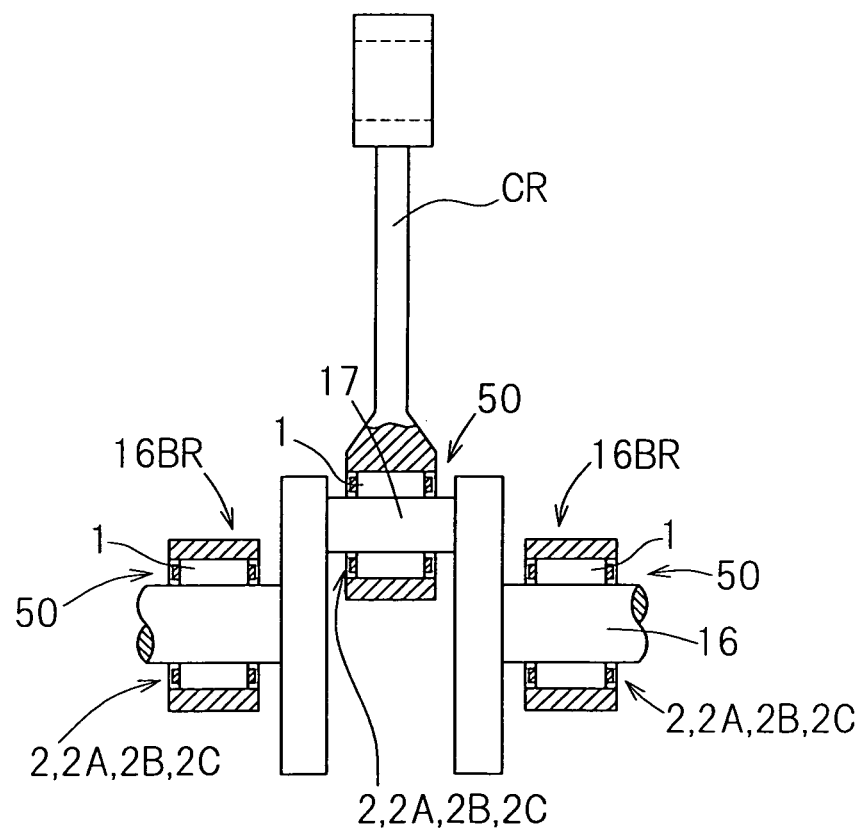
FIG. 13 is a fragmentary sectional view showing a bearing assembly for a connecting rod large end in an engine, which bearing assembly utilizes the caged roller bearing.

FIG. 13 illustrates a fragmentary sectional view of a bearing assembly for a connecting rod large diameter end in an engine, which assembly makes use of the caged roller bearing. As shown therein, the caged roller bearing 50 of the structure according to one of the previously described embodiments is utilized as support bearings 16BR and 16BR for a crankshaft 16 and a bearing used at a connection between a connecting rod CR and the crankshaft 16, that is, a bearing for a connecting rod large end.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Roller
2, 2A, 2B . . . Roller retaining cage
3 . . . Pocket
4 . . . Plated backing layer
5 . . . Ni•PTFE plated layer
13 . . . PTFE plated layer
14 . . . Outer ring
15 . . . Second roller retaining cage

What is claimed is:

1. A caged roller bearing comprising;
a plurality of rollers; and
a ring-shaped roller retaining cage having pockets defined therein at circumferential locations thereof for accommodating the respective rollers therein;
a plated backing layer applied to one or both of at least an outer diametric surface and opposite end faces of the roller retaining cage, which are selected from the entire surface of the roller retaining cage; and
an Ni•PTFE plated layer applied to a surface of the plated backing layer, the Ni•PTFE plated layer containing nickel and polytetrafluoroethylene,
wherein a surface hardness of the Ni•PTFE plated layer is within the range of Hv 400 to Hv 700, and
a surface hardness of the roller retaining cage is within the range of Hv 450 to Hv 700 and a difference between the surface hardness of the roller retaining cage and the hardness of the Ni•PTFE plated layer is not greater than Hv 200.

2. The caged roller bearing as claimed in claim 1, in which polytetrafluoroethylene contained in the Ni•PTFE plated layer is a composition in which particles of polytetrafluoroethylene are dispersed in a nickel plating.

3. The caged roller bearing as claimed in claim 1, in which the plated backing layer is a nickel plated layer.

4. The caged roller bearing as claimed in claim 1, in which the Ni•PTFE plated layer has a surface roughness smaller than or equal to Ra 0.7 μm.

5. The caged roller bearing as claimed in claim 1, in which the plated backing layer is in the form of a nickel plated layer and the Ni•PTFE plated layer applied to a surface of the plated backing layer contains polytetrafluoroethylene in a quantity within the range of 20 to 35 vol. %.

6. The caged roller bearing as claimed in claim 1, in which the plated backing layer is applied over the entire surface of the roller retaining cage and the Ni•PTFE plated layer applied to the surface of the plated backing layer is hardened by means of a heat treatment to render the hardness of the Ni•PTFE plated layer after the heat treatment to have the value within the range of Hv 400 to Hv 700.

7. The caged roller bearing as claimed in claim 6, in which the roller retaining cage is carburized and is subsequently tempered to have the surface hardness within the range of Hv 450 to Hv 700.

8. The caged roller bearing as claimed in claim 1, in which the total film thickness of the plated backing layer and the Ni•PTFE plated layer is selected within the range of 8 to 22 μm.

9. A roller retaining cage, which is used in the caged roller bearing of a structure as defined in claim 1.

10. A caged roller bearing assembly which comprises the caged roller bearing of a structure as defined in claim 1 and a raceway ring with which the rollers contact.

11. A support bearing assembly for supporting a crankshaft of an engine, which utilizes the caged roller bearing of a structure as defined in claim 1.

12. A bearing assembly for a large diameter end of a connecting rod of an engine, which utilizes the caged roller bearing of a structure as defined in claim 1.

13. A support bearing assembly for a transmission, which utilizes the caged roller bearing of a structure as defined in claim 1.

* * * * *